Patented Apr. 6, 1948

2,439,153

UNITED STATES PATENT OFFICE 2,439,153

AZO DYES FROM DIHYDROXY BENZIDINE

Fritz Straub, Kaiseraugst, and Jakob Brassel and Peter Pieth, Basel, Switzerland, assignors to Society of Chemical Industry in Basle, Basel, Switzerland, a Swiss firm No Drawing. Application August 16, 1943, Serial No. 498,885. In Switzerland February 18, 1941

2 Claims. (Cl. 260—161)

This application is a continuation-in-part of our copending application Serial No. 431,172, filed February 16, 1942, now abandoned.

The present invention is concerned with valuable new disazo dyestuffs, and a process for preparing the same. The present invention is particularly concerned with direct dyeing cotton dyestuffs (also called substantive dyestuffs), and still more particularly with dyestuffs capable of being metallized, for instance coppered, in substance, in the dye-bath or on the fiber, as the case may be.

According to the present invention tetrazotized 3:3'-dihydroxy-4:4'-diaminodiphenyl is coupled with two molecular proportions of coupling components as defined hereinafter.

3:3'-dihydroxy-4:4'-diaminodiphenyl, which is a known compound and which may be obtained for instance by saponifying dianisidine by means of aluminum chloride, has not hitherto found any industrial use. Although a few dyestuffs prepared with tetrazotized 3:3'-dihydroxy-benzidine have been described in the literature, the said compound has generally been regarded to be of no practical value. This is probably due to several facts. First of all it was generally believed that the said product would be too expensive for the commercial manufacture of dyestuffs. Furthermore, the very few dyestuffs hitherto prepared with the said tetrazo compound did not show properties which might make them compete successfully with other dyestuffs, and it is to be remarked that, according to the prescriptions found in the literature, correct coupling is in most cases not brought about, which obviously does not lead to correct disazo dyestuffs.

According to the present invention it has been found that the cost of 3:3'-dihydroxy-4:4'-diaminodiphenyl is by no means prohibitive for the manufacture of dyestuffs therefrom, since such dyestuffs as hereinafter defined show very valuable properties which more than outweigh any difficulties encountered in preparing the said starting material. Further, it will be shown hereinafter that correct coupling to form correct disazo dyestuffs can be brought about, and that dyestuffs of much superior properties can be produced thereby.

For the sake of simplicity coupling may be carried out with two molecular proportions of the same coupling component. However, it is not unduly difficult to effect coupling with two different coupling components since tetrazotized 3:3'-dihydroxy-4:4'-diaminodiphenyl has a great tendency to couple first with one diazo group and afterwards with the other.

3:3'-dihydroxy-4:4'-diaminodiphenyl may be obtained by saponification of dianisidine by means of aluminum chloride and may be purified if necessary according to known methods. It may be tetrazotized in known manner and the tetrazo compound may be used immediately after tetrazotizing or may be separated, as described in the examples below.

According to one feature of the present invention tetrazotized 3:3'-dihydroxy-4:4'-diaminodiphenyl is coupled with two molecular proportions of coupling components, at least one of which contains at least one nitrogen atom having attached thereto at most one hydrogen atom.

The coupling components containing nitrogen mentioned above, may belong to the isocyclic, heterocyclic or open chain series. As a first group of such components hydroxy naphthalenes containing at least one nuclearly bound sulfonic acid group are mentioned. They must contain at least one nitrogen atom which is bound in a form different from primary amino groups. Thus it may be in the form of secondary or acylated amino group, e. g., as an imide linkage between two radicals such as in 5:5'-dihydroxy-2:2'-dinaphthylamino-7:7'-disulfonic acid, 2-phenylamino-5-hydroxynaphthalene-7-sulfonic acid, 2-phenylamino-8-hydroxynaphthalene-6-sulfonic acid, or in form of an acid amide group such as in 1-toluenesulfonylamino-8-hydroxynaphthalene-4-sulfonic acid or in the form of a nitro group. The said nitrogen atom may further be present as a member of a heterocyclic ring such as in pyrazolones. It is, as a rule, desirable to select the coupling components so as coupling will take place in the ortho position to a hydroxyl group.

Besides the above mentioned coupling components other suitable components, such as aminonaphtholsulfonic acids in which the amino group is acylated by any suitable carboxylic or sulfonic acid, may be used, wherein the acid may be aliphatic (formic, acetic, propionic acid, etc.) aromatic (benzoic, naphthoic acid, etc.) or heterocyclic (pyridine-carbamic acid, etc.) and contain further substituents. If only one coupling component of this kind is used as remaining coupling components any such component may be used, for instance those belonging to the benzene, naphthalene or open-chain series.

As a further group of coupling components those containing nitrogen in a heterocyclic ring and especially pyrazolones come into consideration. They may contain substituents as usual, for instance an aryl (phenyl or naphthyl) group in the 1 and an alkyl (e. g., methyl) or carboxyl or modified carboxyl group in the 3-position; the aryl group may itself be substituted for instance by halogen, nitro or sulfo groups or by the sulfamido or salicylic acid grouping, etc.

Especially valuable dyestuffs are obtained with pyrazolone coupling components free from sulfonic acid groups. It is surprising that the dyestuffs obtained with such components are soluble enough for dyeing purposes, even if they are completely devoid of solubilizing groups, i. e. if they contain not even a carboxylic acid group. It is further surprising that pyrazolones can be correctly coupled with tetrazotized 3:3′-dihydroxybenzidine in a medium alkaline even with sodium carbonate without difficulties in many instances.

In all the instances mentioned above coupling is effected in an alkaline medium. It is to be remarked, however, that there are many coupling components, especially those of the naphthalene series, which do not combine in a satisfactory manner with tetrazotized 3:3′-dihydroxy-4:4′-diamino-diphenyl when coupling occurs in the usual manner, i. e. in a medium alkaline with sodium carbonate, even if pyridine or similar promoters are added. The combination is often incomplete to such an extent that only little or no disazo dyestuff is produced, and a monoazo dyestuff is obtained as main product. It is a further feature of the present invention that in all instances where combination is slow and/or incomplete with the usual coupling methods, coupling is effected in a medium alkaline with a hydroxide of the alkali or alkaline earth metal series including ammonia. It is often desirable to use strongly caustic alkaline media, for instance strong solutions of caustic potash or soda, but, in other instances, the hydroxides of calcium, barium, strontium or magnesium are suitable too, whereas media substantially free from carbonate generally appear to be desirable whenever combination is difficult.

The disazo dyestuffs of the present invention are suitable for dyeing and printing the most diverse materials, especially cellulose fibers, such as cotton and other vegetable fibers, rayon from regenerated cellulose including staple fibers, and also for dyeing and printing animal fibers such as wool, silk and leather. Due to the fact that the said dyestuffs are derived from an ortho-hydroxydiazo compound they are capable of forming complex metal compounds, for instance, with the metals copper, cobalt, nickel, iron, chromium, vanadium, manganese.

Many of the foregoing dyestuffs yield very valuable complex metal compounds if treated in substance with agents yielding metal. This is especially true of those dyestuffs which contain more than two sulfonic acid groups, for instance those derived from two coupling components belonging to the group of hydroxynaphthalene disulfonic acid coupling components. With other dyestuffs it may be more advantageous to effect metallization during or, still better, after dyeing according to the known aftertreating methods. With special advantage use may be made of the dyeing methods described in U. S. Patents 2,148,659 and 2,185,905, whereby metallizing is preferably carried out with agents yielding metal which are stable towards alkalies, for instance complex tartrates of copper or other metals.

In some causes it may also be useful to treat some dyestuffs as mentioned above in substance with such alkaline metallizing agents.

Furthermore it is possible to make use of complex metal compounds of the dyestuffs according to the present invention for coloring masses, varnishes, lacquers, resins, both artificial and natural, and spinning solutions.

Whether it is preferable to produce the aforementioned complex metal compounds on the fiber or in substance depends on various properties thereof, inter alia, whether the complex metal compounds are soluble, whether the metal-free dyestuffs possess sufficient affinity for the fiber to be dyed, etc.

The following examples illustrate the invention, the parts being by weight unless otherwise stated:

Example 1

An aqueous solution of 2.76 parts of sodium nitrite is added to 4.32 parts of 3:3′-dihydroxy-4:4′-diaminodiphenyl dissolved in a mixture of 10 parts by volume of hydrochloric acid of 30 percent strength and 200 parts of water. Tetrazotization takes place at once.

7.83 parts of 1-phenyl-3-methyl-5-pyrazolone and 5 parts of anhydrous sodium carbonate are dissolved in 200 parts of water with addition of 11 parts by volume of caustic soda of 30 percent strength. To this mixture at 10–15° C. the tetrazo solution prepared as above is added, and the whole is stirred for 24 hours at room temperature. 20 parts by volume of caustic soda of 30 percent strength are then added, and stirring is continued for a further 6 hours, when the alkaline reaction of the coupling mixture is neutralized with 18 parts by volume of hydrochloric acid of 30 percent strength, and the dyestuff is precipitated by addition of common salt, filtered and dried.

The dyestuff of the formula

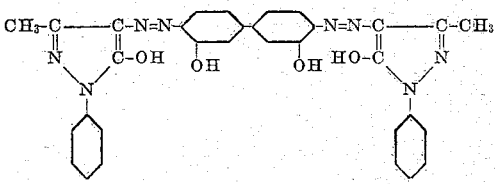

thus obtained dyes cotton and, on subsequent coppering, yields ruby shades which are fast to light and washing. The coppering can be advantageously carried out in the bath used for the dyeing process.

If 9.86 parts of 1-(3′-nitrophenyl-)-3-methyl-5-pyrazolone be used in place of 7.83 parts of 1-phenyl-3-methyl-5-pyrazolone, a dyestuff is obtained which is somewhat less soluble than the above but which possesses similar properties.

If 10.7 parts of 1-(3′-sulfamidophenyl-)-3-methyl-5-pyrazolone be used, a dyestuff is obtained in the same manner which dyes cotton and which, after subsequent coppering, yields ruby red shades of good fastness to washing and excellent fastness to light. This dyestuff exemplifies the preferred form of the present application, to which the appended claims are directed.

Example 2

4.32 parts of 3:3′-dihydroxybenzidine are tetrazotized in the presence of hydrochloric acid in the usual manner with sodium nitrite. The resulting suspension of the tetrazo compound is united with a solution of 9.4 parts 1-(4′-hydroxy-3′-carboxyphenyl)-3-methyl-5-pyrazolone and 12 parts of anhydrous sodium carbonate in 100 parts of water. The coupling temperature is maintained at 10 to 12° C. for 2 hours and then at 35 to 40° C. for from 40 to 50 hours. The disazo dyestuff formed is mostly precipitated. After precipitation and drying it forms a dark green bronzy powder of the formula

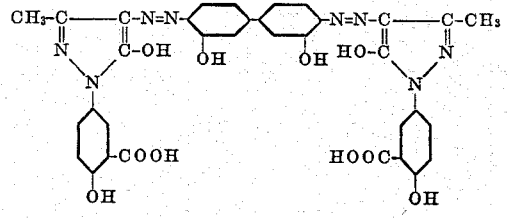

which dissolves in water to a brownish red, in dilute soda-solution to a bordeaux red, in caustic alkalies to a reddish orange and in concentrated sulphuric acid to a bluish red solution. It dyes vegetable fibers, according to the one or two baths after-coppering process, clear bordeaux shades which are very fast to washing and to light.

What we claim is:

1. The disazo dyestuff of the formula

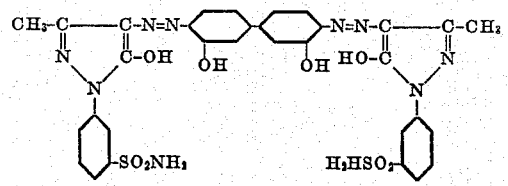

2. Process for the manufacture of disazo dyestuffs, comprising coupling in an alkaline medium a tetrazotized 3:3'-dihydroxy-4:4'-diaminodiphenyl with two molecular proportions of a 1-(3'-sulfamidophenyl)-3-methyl-5-pyrazolone.

FRITZ STRAUB.
JAKOB BRASSEL.
PETER PIETH.

REFERENCES CITED

The following references are of record in the file of this patent:

UNITED STATES PATENTS

| Number | Name | Date |
|---|---|---|
| 1,210,751 | Anderwert et al. | Jan. 2, 1917 |
| 1,889,732 | Stusser et al. | Nov. 29, 1932 |
| 2,193,438 | Taube | Mar. 12, 1940 |
| 2,241,796 | Taube | May 13, 1941 |

FOREIGN PATENTS

| Number | Country | Date |
|---|---|---|
| 102,881 | Great Britain | Jan. 4, 1917 |
| 163,896 | Switzerland | Nov. 16, 1933 |
| 410,192 | Great Britain | May 14, 1934 |

Certificate of Correction

Patent No. 2,439,153. April 6, 1948.

FRITZ STRAUB ET AL.

It is hereby certified that errors appear in the printed specification of the above numbered patent requiring correction as follows: Column 3, line 75, for the word "causes" read *cases*; column 5, claim 1, in the formula, lower right hand portion thereof, for

and that the said Letters Patent should be read with these corrections therein that the same may conform to the record of the case in the Patent Office.

Signed and sealed this 8th day of June, A. D. 1948.

[SEAL]

THOMAS F. MURPHY,
*Assistant Commissioner of Patents.*